United States Patent
Jin et al.

(10) Patent No.: US 12,296,837 B2
(45) Date of Patent: May 13, 2025

(54) VEHICLE JUDDER DIAGNOSTIC METHOD USING ARTIFICIAL INTELLIGENCE AND MOBILE-BASED GDS

(71) Applicants: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

(72) Inventors: Jae-Min Jin, Seoul (KR); In-Soo Jung, Goyang-si (KR); Joon-Hyuk Chang, Seoul (KR)

(73) Assignees: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 240 days.

(21) Appl. No.: 17/986,204

(22) Filed: Nov. 14, 2022

(65) Prior Publication Data

US 2023/0256982 A1   Aug. 17, 2023

(30) Foreign Application Priority Data

Feb. 16, 2022   (KR) .................. 10-2022-0019998

(51) Int. Cl.
  *B60W 50/04*   (2006.01)
  *B60W 40/105*  (2012.01)
  *G06N 3/04*    (2023.01)

(52) U.S. Cl.
  CPC .......... *B60W 50/04* (2013.01); *B60W 40/105* (2013.01); *G06N 3/04* (2013.01);
  (Continued)

(58) Field of Classification Search
  CPC ............... B60W 50/04; B60W 40/105; B60W 2050/041; B60W 2510/0241; B60W 2510/06; G06N 3/04
  See application file for complete search history.

(56) References Cited

U.S. PATENT DOCUMENTS

2005/0189192 A1   9/2005  Serebrennikov
2006/0064291 A1*  3/2006  Pattipatti ............ G05B 23/0251
                                               703/14

(Continued)

FOREIGN PATENT DOCUMENTS

DE   102014206183 A1 * 10/2014  ............ B60K 6/387
JP      2018105345 A    7/2018

(Continued)

*Primary Examiner* — Jess Whittington
*Assistant Examiner* — Terry C Buse
(74) *Attorney, Agent, or Firm* — MCDONNELL BOEHNEN HULBERT & BERGHOFF LLP

(57) ABSTRACT

A vehicle judder diagnostic method using artificial intelligence applied to a mobile-based GDS according to the present disclosure is characterized in that the mobile-based GDS samples a plurality of sensor signals of a sensor mounted in a vehicle in a vehicle during operation in a judder evaluation mode to quickly, separately diagnose whether the judder phenomenon of the vehicle is a geometric judder or a friction judder by mounting a deep neural network (DNN) model, developed by the trial and error process of a DNN by using the plurality of sensor signals of a test vehicle mounted with a double clutch transmission (DCT), as a judder determination artificial intelligence model 30 in the mobile-based GDS.

18 Claims, 5 Drawing Sheets

(52) U.S. Cl.
CPC .............. *B60W 2050/041* (2013.01); *B60W 2510/0241* (2013.01); *B60W 2510/06* (2013.01)

(56) References Cited

U.S. PATENT DOCUMENTS

| | | |
|---|---|---|
| 2010/0057314 A1 | 3/2010 | Yoshino et al. |
| 2014/0249726 A1 | 9/2014 | Kaneko |
| 2017/0138419 A1* | 5/2017 | Neuberth ................ F16D 48/06 |
| 2017/0341656 A1 | 11/2017 | Nilsson |
| 2020/0040988 A1* | 2/2020 | Duan .................... F16D 48/066 |
| 2021/0118250 A1 | 4/2021 | Miyasaka et al. |
| 2021/0164562 A1 | 6/2021 | Tabata et al. |
| 2023/0059562 A1* | 2/2023 | Chan ....................... G06F 30/20 |

FOREIGN PATENT DOCUMENTS

| | | |
|---|---|---|
| KR | 101378660 B1 | 3/2014 |
| KR | 101889049 B1 | 8/2018 |

\* cited by examiner

<EXAMPLE OF STRUCTURE OF JUDDER DETERMINATION ARTIFICIAL INTELLIGENCE MODEL>

VEHICLE JUDDER DIAGNOSTIC METHOD USING ARTIFICIAL INTELLIGENCE AND MOBILE-BASED GDS

CROSS-REFERENCE TO RELATED APPLICATION

This application claims priority to Korean Patent Application No. 10-2022-0019998, filed on Feb. 16, 2022, which is incorporated herein by reference in its entirety.

BACKGROUND

Field

The present disclosure relates to a vehicle judder diagnostic method, and particularly, to a mobile-based global based diagnostic system (GDS) using artificial intelligence to diagnose a judder phenomenon that generates vibration when starting a vehicle or operating an engine.

Description of Related Art

A vehicle generally has a problem of vibration generated by a judder phenomenon upon starting or operating, and this is because the RPM of a clutch of a transmission is changed when shifting is performed. In this case, the judder phenomenon may be caused by the change in the RPM of the clutch but may not always be proportional to the size of the change.

For example, the judder phenomenon is caused by a geometry judder and a friction judder. The judder phenomenon caused by the geometry judder is caused by geometric deviation of a rotation mechanism of a clutch system and has the characteristics that an occurrence frequency varies and an occurrence time interval lasts longer than the friction judder, and the judder phenomenon caused by the friction judder is caused by a change in friction characteristics due to the contamination or durability of a clutch friction material and has the characteristics that the occurrence frequency is fixed and the occurrence time interval lasts shorter than the geometry judder.

In particular, a double clutch transmission (DCT) among transmissions uses two clutches to perform automatic shifting through switching of an operation clutch, and therefore, the DCT itself has the advantage of providing the convenience of an auto transmission even if it is a manual transmission whereas a DCT-mounted vehicle performs shifting with two clutches, thereby causing more greatly judder phenomenon caused by the vibration when starting a vehicle or operating an engine.

Therefore, a vehicle, particularly, a DCT-mounted vehicle, determines whether the judder phenomenon occurs by using judder diagnostic software (or logic), and the judder diagnostic software (or logic) is driven by a GDS, which is mobile or tablet PC-based diagnostic equipment.

For example, the tablet PC-based diagnostic equipment (GDS) may be based on a vibration sensor mounted on a tablet PC together with the judder diagnostic software (or logic) capable of communicating (e.g., controller area network (CAN)) with control units provided in the vehicle and may determine whether the judder occurs by signal-processing a vibration sensor value (or acceleration sensor value) of the tablet PC in a judder evaluation mode of the judder diagnostic software (or logic).

As described above, the tablet PC-based diagnostic equipment (GDS) determines whether the judder occurs in the judder evaluation mode, thereby greatly contributing to improving and preventing the judder phenomenon caused by the vibration of the vehicle when the vehicle, particularly, the DCT-mounted vehicle starts.

However, the tablet PC-based diagnostic equipment (GDS) applies an indirect diagnostic method that uses, as input data of the judder evaluation mode, the vibration sensor value (or acceleration sensor value) detected by the vibration sensor (or acceleration sensor) of the tablet PC randomly positioned in the vehicle.

Therefore, the diagnostic result of the judder evaluation mode in which the sensor value (e.g., the acceleration sensor value) of the sensor attached to or mounted on the vehicle is not used is vulnerable to disturbance, and particularly, has a limit in that it is not possible to reduce the error occurrence due to the deviation of the mass production of the sensor.

This reason is that the geometric judder phenomenon requires a double clutch replacement and therefore, is relatively expensive whereas the friction judder phenomenon enables improvement with the judder diagnostic software (or logic) and has a method different from the above but the diagnostic result of the judder evaluation mode also has a limit in that the geometric judder and the friction judder may not be classified.

As described above, the conventional tablet PC-based diagnostic equipment (GDS) has a fundamental limit in that it is not possible to directly use the signal value of the acceleration sensor mounted in the vehicle.

This reason is that it is impossible to determine the judder only by processing the signal because the acceleration sensor signal value of the vehicle has low signal sampling rate and resolution even if it is preferable that the standard of the maximum value of the vibration is applied to whether the judder phenomenon occurs after the signal processing by the band-pass filter mounted in the vehicle to filter the signal of the acceleration sensor with the frequency band signal of the judder determination based on the determination standard used upon developing the judder diagnostic logic.

The contents described in Description of Related Art are to help the understanding of the background of the present disclosure, and may include what is not previously known to those skilled in the art to which the present disclosure pertains.

SUMMARY

An object of the present disclosure is to provide a vehicle judder diagnostic method using artificial intelligence and a mobile-based GDS, which may provide a reliable service to a customer by determining a judder phenomenon using only signals of a plurality of sensors mounted in a vehicle by using artificial intelligence in a judder evaluation mode operation that diagnoses vibration when starting a vehicle or operating an engine, and particularly, separately diagnosing whether the occurrence cause of the judder phenomenon is a geometric judder or a friction judder in addition to the quick judder phenomenon determination as in the conventional method by using artificial intelligence in a tablet PC-based GDS.

A vehicle judder diagnostic method using artificial intelligence according to the present disclosure for achieving the object includes a data sampling step of sampling input data by using a mobile-based GDS in a test vehicle whose judder occurrence is measured by a judder occurrence determination device, and extracting artificial intelligence use data, a deep neural network (DNN) model building step of developing the artificial intelligence use data as a judder determination artificial intelligence model through the trial and error of a DNN, and an artificial intelligence diagnosis step of mounting the judder determination artificial intelligence model in the mobile-based GDS and confirming whether the judder occurs in a judder evaluation mode of a vehicle.

As a preferred exemplary embodiment, the input data are acquired by sampling sensor signals of the test vehicle and the vehicle, and the types of the sensor signals are one or more among an engine RPM, a clutch input shaft RPM, a longitudinal acceleration, a vehicle speed, a clutch temperature, and a clutch slip RPM.

As the preferred exemplary embodiment, the data sampling step includes a test data preparation step of building the test vehicle, a GDS measurement step in which the test vehicle is operated in a judder diagnostic mode and the mobile-based GDS performs the sampling while the judder occurrence determination device detects an accelerometer measurement signal of the test vehicle, a step of extracting data labelling by labelling the input data a data labelling refining step of removing influence of the size of the data labelling and influence of the sampling period, and a step of extracting the artificial intelligence use data by classifying the data labelling into learning data and validation verification data.

As the preferred exemplary embodiment, the preparing of the test data includes selecting a DCT and a double clutch as a judder test device, selecting the DCT and the double clutch as the test vehicle and defining the judder evaluation for the test vehicle.

As the preferred exemplary embodiment, the double clutch is composed of two types of geometric judder occurrence samples of a clutch due to deformation of a clutch cover and exceeding a processing error limit of a cover plate, three types of friction judder occurrence samples of the clutch due to aging of the vehicle, a change in a physical property value of a clutch surface material, and a deterioration test of the clutch surface, and two types of normal state samples of a new clutch and the clutch in a normal state after the aging of the vehicle.

As the preferred exemplary embodiment, the judder evaluation is classified into a vehicle operation condition and a judder test condition, in which the vehicle operation condition indicates a warm-up state and a vehicle starting state without operating an acceleration pedal from a stop on a general road, and the judder test condition indicates a clutch temperature region for the double clutch.

As the preferred exemplary embodiment, the clutch temperature region is classified into five temperature regions at an interval of 50° C., and the five temperature regions each have 20 quantities, and 100 quantities are applied as the judder test condition.

As the preferred exemplary embodiment, the GDS measurement includes measuring the test data that the mobile-based GDS samples a plurality of sensor signals detected by a vehicle control unit of the test vehicle as the input data, and determining satisfaction of the input data with a sampling period.

As the preferred exemplary embodiment, 1400 input data are measured through the sampling, and the satisfaction of the sampling period is confirmed in a state where a measurement required time interval of the sampling does not exceed a measurement set time interval, and wherein the plurality of sensor signals are resampled if the measurement required time interval is longer than the measurement set time interval. As the preferred exemplary embodiment, the labelling generates the data labelling by determining the judder occurrence for the input data classified into "No judder problem," "Judder problematic level," "Geometric judder," and "Friction judder."

As the preferred exemplary embodiment, the refining of the data labelling includes normalizing and standardizing the input data, and converging the time interval to 0 when a measurement required time interval of the sampling for the input data is shorter than a measurement set time interval.

As the preferred exemplary embodiment, the learning data and the validity verification data are classified by the quality of the data labelling, in which the learning data applies 70% of the data labelling, and the validity verification data applies 30% of the data labelling.

As the preferred exemplary embodiment, the building of the DNN model includes reading learning data of the artificial intelligence use data, designing an artificial intelligence model by building the DNN model in the DNN from the learning data, reading validity verification data of the artificial intelligence use data, processing, by the DNN, the validity verification data as an input, verifying an output of the artificial intelligence model with set judder diagnostic accuracy, and redesigning an artificial intelligence model that builds the DNN model again by the trial and error if the judder diagnostic accuracy is less than a set value or satisfying model verification that establishes the judder determination artificial intelligence model if the judder diagnostic accuracy is equal to or greater than the set value.

As the preferred exemplary embodiment, the designing of the artificial intelligence model includes extracting features from the learning data with CNN and MP, and building the DNN model by connecting an input and an output by a layer.

As the preferred exemplary embodiment, the judder diagnostic accuracy is a percentage for each of "No judder problem," "Judder problematic level," "Geometric judder," and "Friction judder," and the set value is set as 90%.

As the preferred exemplary embodiment, the performing of the artificial intelligence diagnosis samples the plurality of sensor signals of the vehicle by the mobile-based GDS to acquire the sampled sensor signals as the input data of the vehicle, confirms whether the judder occurs by processing the input data of the vehicle with the judder determination artificial intelligence model driven by the mobile-based GDS, and classifies the judder into a geometric judder identified as a state where an occurrence frequency is changed and a friction judder identified as a state where the occurrence frequency is fixed.

In addition, a mobile-based GDS according to the present disclosure for achieving the object includes a judder determination artificial intelligence model that extracts a plurality of sensor signals as artificial intelligence use data by sampling the plurality of sensor signals of a test vehicle, applies the artificial intelligence use data to building a DNN model with the trial and error of a DNN, and diagnoses a judder with the plurality of sensor signals sampled during operation of a vehicle in a judder evaluation mode to classify a geometric judder and a friction judder with a difference between occurrence frequencies.

As a preferred exemplary embodiment, the test vehicle and the vehicle are vehicles mounted with a DCT, and the judder determination artificial intelligence model is driven by a tablet PC-based GDS.

The vehicle judder diagnosis using artificial intelligence implemented in the mobile-based GDS according to the present disclosure implements the following operations and effects.

First, it is possible to diagnose the judder phenomenon by using only the signal of the sensor mounted on the vehicle measured by the control unit of the vehicle by compensating the low rate and resolution of the signal sampling of the sensor signal value necessary for diagnosing the judder phenomenon with artificial intelligence. Second, it is possible to take the appropriate action depending upon the judder occurrence cause by clearly classifying the occurrence causes of the judder phenomenon into the geometric judder, which requires the double clutch replacement, and the friction judder, which may be improved by using the judder diagnostic software (or logic), with the artificial intelligence logic. Third, it is possible to determine the level and cause of the judder by using the signal of the accelerometer among the sensors mounted on the vehicle and the values of other sensors together to diagnose the judder phenomenon, thereby being not affected by disturbance that is a concern when using the conventional vibration sensor mounted on the tablet PC. Fourth, it is possible to perform the rudder diagnosis robust to the disturbance by outputting the judder determination based on the data processed by allowing the artificial intelligence logic to learn the signal sampling data refined through normalization and standardization processing. Fifth, it is possible to provide the reliable service to the customer by determining whether the judder occurs easily and conveniently in the short time interval in the real vehicle use conditions by mounting the artificial intelligence logic in the GDS, which is the tablet PC-based diagnostic equipment.

DETAILED DESCRIPTION

Hereinafter, an exemplary embodiment of the present disclosure will be described in detail with reference to the accompanying exemplary drawings, and this exemplary embodiment is an example and may be implemented by those skilled in the art to which the present disclosure pertains in various different forms, and therefore, the present disclosure is not limited to the exemplary embodiment described here.

Figure 1:
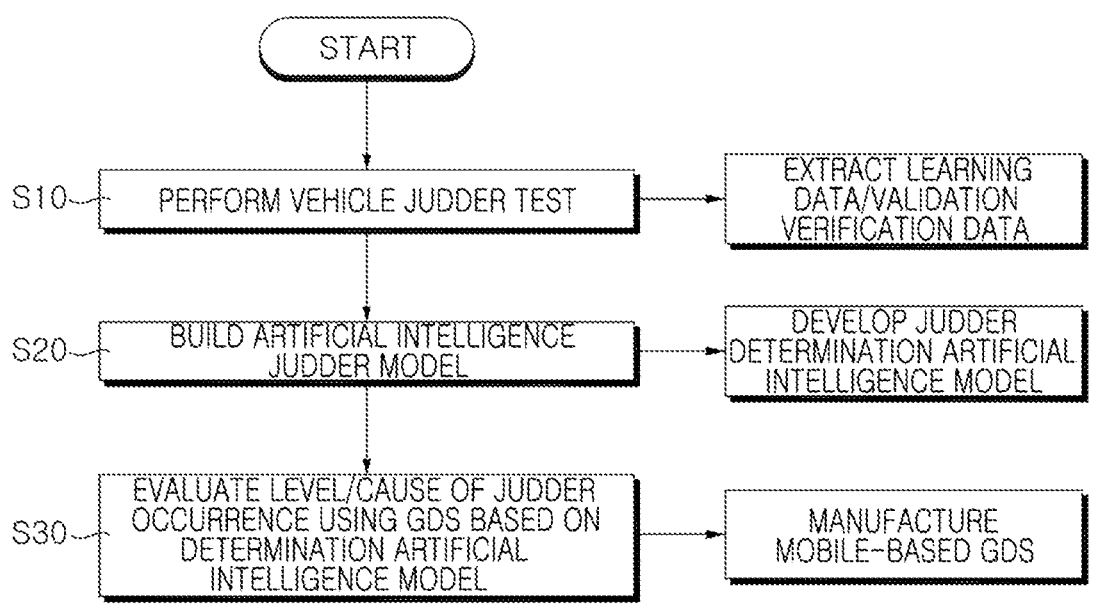
FIG. 1 is a schematic flowchart of a vehicle judder diagnostic method using artificial intelligence according to the present disclosure.

Referring to FIG. 1, a vehicle judder diagnostic method using artificial intelligence includes sampling a test data (S10) that performs a vehicle judder test, building a DNN model (S20) that develops a judder determination artificial intelligence model, and performing an artificial intelligence diagnosis (S30) that diagnoses the judder of the vehicle by using a mobile-based global diagnostic system (GDS).

Therefore, the sampling of the test data (S10) extracts artificial intelligence use data (i.e., learning data/validation verification data) from the sample data of a test vehicle, the building of the DNN model (S20) develops a judder determination artificial intelligence model (or DNN model) with artificial intelligence use data, and the performing of the artificial intelligence diagnosis (S30) diagnoses, by a mobile-based GDS 10, the occurrence level/cause of the judder of a real vehicle by using the judder determination artificial intelligence model (or DNN model).

In particular, as the test sample data in performing the vehicle judder test (S10), six input data (i.e., engine RPM, input shaft RPM 1 (clutch 1 input shaft RPM), longitudinal acceleration sensor value, vehicle speed, clutch 1 temperature, and clutch 1 slip RPM) among a plurality of signals of a vehicle control unit (see FIG. 3) of a test vehicle 1 or a vehicle 1-1 communicating with the GDS are acquired.

Therefore, the vehicle judder diagnostic method using artificial intelligence may constitute artificial intelligence determination model software (S/W) that determines the level and occurrence cause of the judder problem by using a mobile (e.g., tablet)-based diagnostic device as the GDS, and subdivide the results processed by using six signal data generated in the real vehicle as input values in the artificial intelligence determination model into the judder phenomenon output of "Problematic level" or "No problem" and the judder cause output of "Geometric judder" or "Friction judder".

As described above, the vehicle judder diagnostic method using artificial intelligence may implement the characteristics that determine the problematic level and classify the occurrence cause of the judder by using only the signal output from the control unit that may be measured through the GDS in the vehicle during the judder evaluation mode operation.

Figure 2:
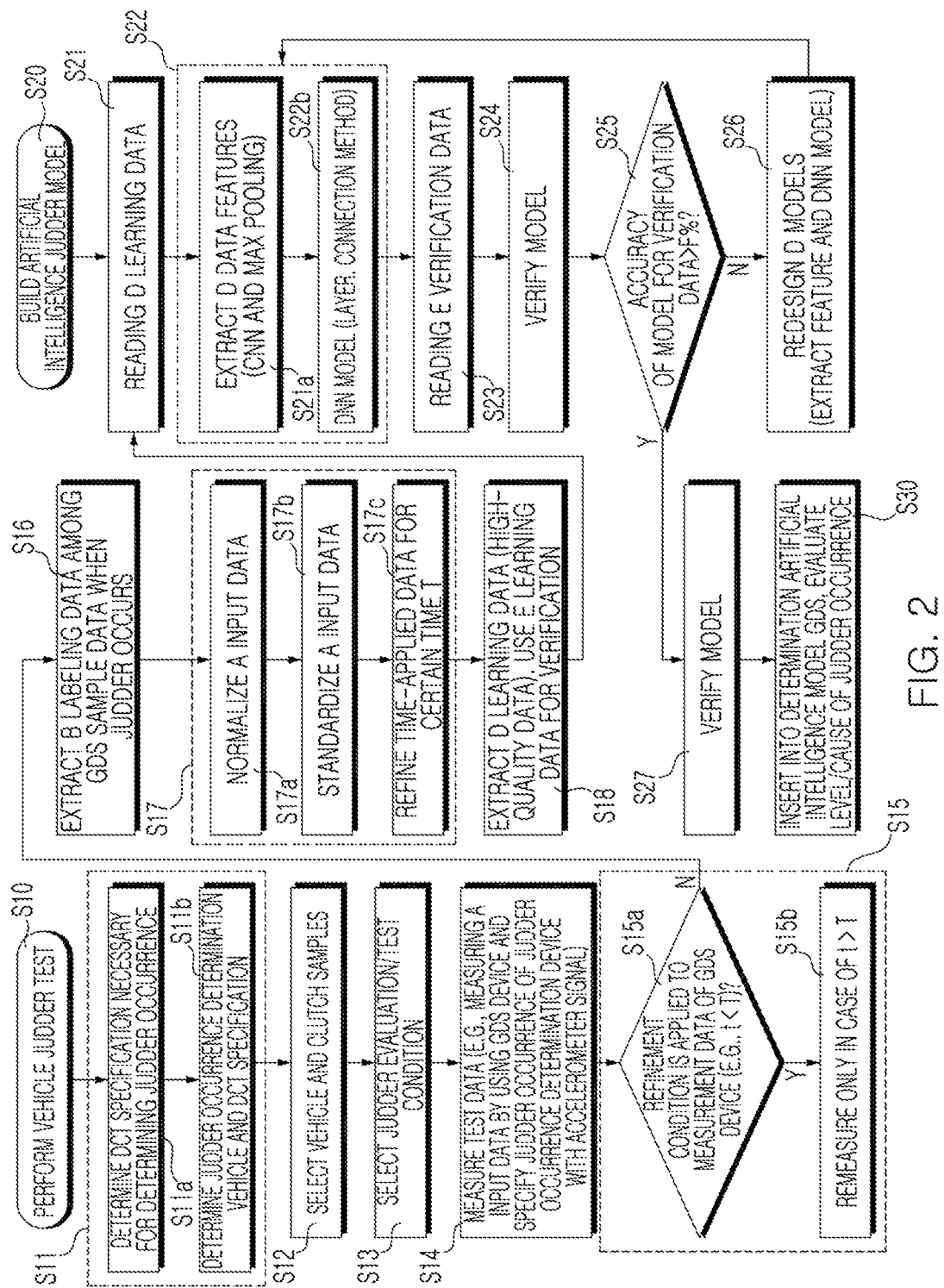
FIG. 2 is a detailed flowchart of the vehicle judder diagnostic method using artificial intelligence according to the present disclosure.

FIG. 2 shows a detailed implementation procedure of the vehicle judder diagnostic method using artificial intelligence. In this case, the control subject is one or more among a vehicle control unit 5, the mobile-based GDS 10, and a judder occurrence determination device 20, and the control target (or diagnostic target) is the test vehicle 1 or the vehicle 1-1 when the vehicle judder is tested.

Hereinafter, a detailed implementation procedure of the vehicle judder diagnostic method using artificial intelligence will be described in detail with reference to FIGS. 3 to 5.

Specifically, the sampling of the test data (S10) includes preparing the test data that builds the test vehicle 1 (S11 to S13), performing GDS measurement in which a sampling is performed in the mobile-based GDS 10 by operating the test vehicle 1 in a judder diagnostic mode (S14 and S15), extracting data labelling (S16), refining the data labelling (S17), and extracting artificial intelligence use data (S18).

For example, the preparing of the test data (S11 to S13) is classified into selecting a DCT 2 and a double clutch 3 as a judder test device S11, selecting the DCT 2 and the double clutch 3 as the test vehicle 1, and defining the judder evaluation for the test vehicle 1.

In particular, the selecting of the judder test target (S11) determines the DCT specification necessary for determining the judder occurrence (Sla) and then determines the DCT specification to be applied to the vehicle necessary for determining the judder occurrence among them (S11*b*) by going through a step of determining a DCT type (S11*a*) and determining a step of the DCT specification according to the vehicle (S11*b*).

In addition, in the selecting of the test vehicle (S12), vehicle and clutch test samples are prepared to acquire input data for artificial intelligence use data, and therefore, built as the test vehicle 1 mounted with the DCT necessary for determining the judder occurrence (S11b).

Figure 3:
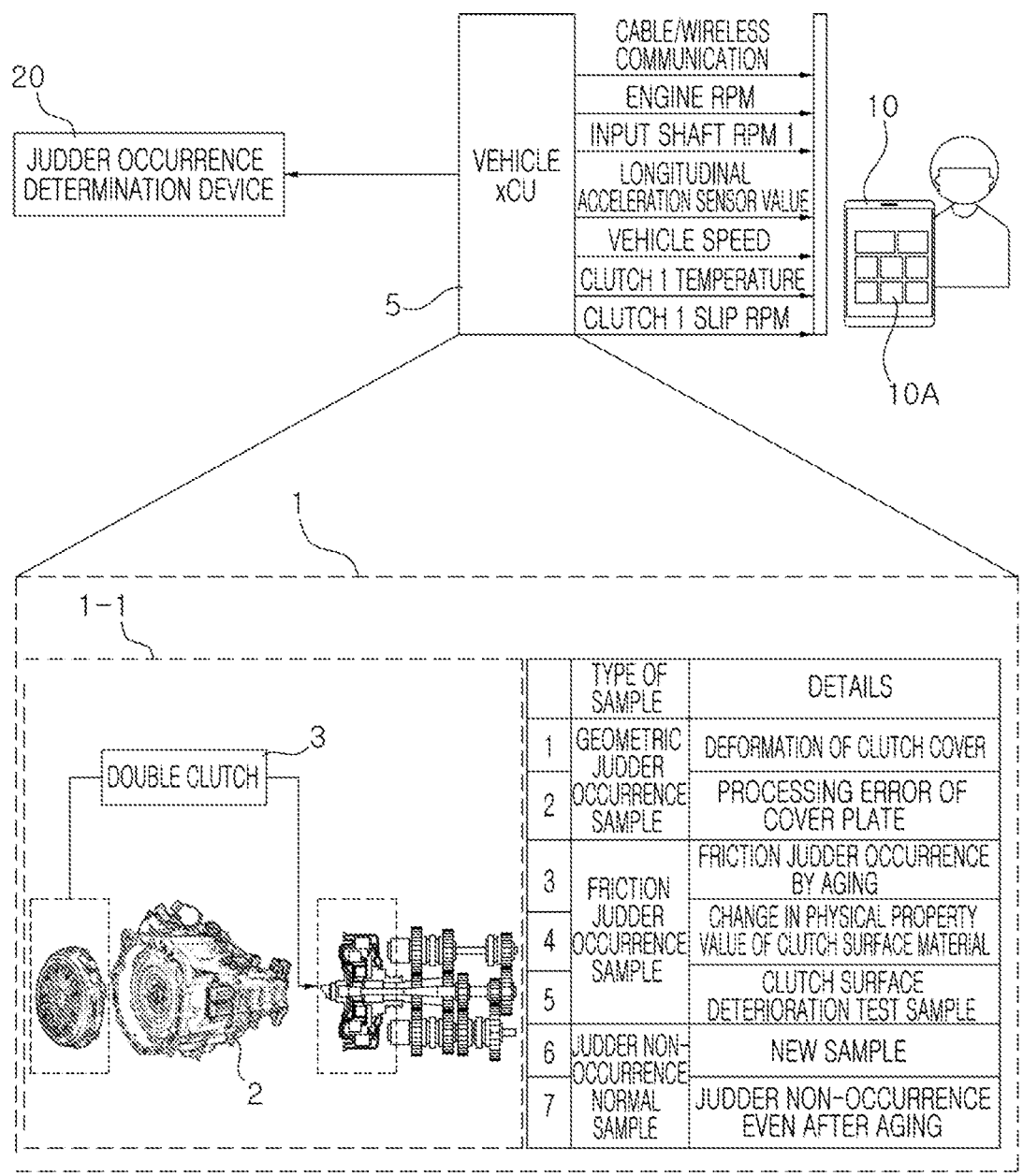
FIG. 3 shows a state of performing a vehicle judder test using a vehicle sample system according to the present disclosure.

Referring to FIG. 3, the test vehicle 1 is composed of the DCT 2, the double clutch 3, and the vehicle control unit 5, and the mobile-based GDS 10 and the judder occurrence determination device 20, which communicate with the vehicle control unit 5 are prepared. In this case, the vehicle control unit 5 is an xCU control unit such as an ECU or TCU.

Specifically, the test vehicle 1 is composed of two types of vehicles and seven types of clutches, in which the two types of vehicles are two or more vehicles each mounted with the DCT 2 having the same specification, and the double clutch 3 is composed of the seven types of clutches, that is, two types of geometric judder occurrence samples, three types of friction judder occurrence samples, and two types of normal state samples so that the clutch vibration depending upon the vehicle vibration and the judder type may be reflected.

In particular, the two types of geometric judder occurrence samples are composed of one geometric judder occurrence sample by deformation of a clutch cover that is the cause of the geometric judder occurrence and one geometric judder occurrence sample due to exceeding a processing error limit of a cover plate. The three types of friction judder occurrence samples are composed of one sample removed from the vehicle whose friction judder occurs by the aging of the vehicle, one judder occurrence sample due to a change in a physical property value of a clutch surface material, and one friction judder occurrence sample due to a clutch surface deterioration test. The two types of normal state samples are composed of one new clutch sample and one normal state clutch sample in which the judder does not occur even after the aging of the vehicle.

In addition, the mobile-based GDS 10 is a GDS in which a judder determination artificial intelligence model 30 (see FIG. 4) is not mounted, and is maintained in a non-operation state to receive the six input data among a plurality of signals of the test vehicle 1 even if the judder determination artificial intelligence model 30 is mounted. Therefore, the mobile-based GDS 10 generates artificial intelligence use data (S18).

In addition, the judder generation determination device 20 is a device that receives an accelerometer measurement signal of the test vehicle I by the vehicle control unit 5 and has a sampling frequency rate and resolution high enough to determine whether the judder occurs based on the maximum value of vibration by using the received accelerometer measurement signal. Therefore, the judder occurrence determination device 20 may extract the data labelling (S16) with the test data in which the judder occurrence is confirmed (S14).

In addition, defining the judder evaluation (S13) defines a vehicle operation condition and a judder test condition.

For example, the vehicle operation condition indicates a vehicle state where the test vehicle has been sufficiently warmed up through traveling for a certain time or more, and is based on a state where the DCT-mounted vehicle starts without operation of an accelerator pedal from a stop on a general road.

In addition, the judder test condition indicates a clutch temperature region of the double clutch 3, and clutch temperature region is classified into five temperature regions at an interval of 50° C., and the five temperature regions each have 20 temperatures, that is, a total of 100 temperatures.

For example, the clutch temperature region in which the interval of 50° C. is applied is 100° C. or more to less than 300° C., and the five temperature regions of the clutch temperature region during traveling are defined as 20 first temperature regions under the condition of less than 100° C., 20 second temperature regions under the condition of 100 to 150° C., 20 third temperature regions under the condition of 150 to 200° C., 20 fourth temperature regions under the condition of 200 to 250° C., and 20 fifth temperature regions under the condition of 250 to 300° C.

Therefore, the judder test condition applies 100 clutch temperatures during traveling.

Specifically, the performing of the GDS measurement (S14 and S15) is classified into measuring the test data that samples the plurality of sensor signals detected by the vehicle control unit 5 of the test vehicle 1 as the input data in the mobile-based GDS 10 (S14) and determining satisfaction for the input data with a sampling period (S15).

For example, the measuring of the test data (S14) acquires the signal of the test vehicle 1 as an input data and one judder determination data. In this case, the A input data are six input data.

Referring to FIG. 3, the mobile-based GDS 10 and the judder occurrence determination device 20 are connected to the vehicle control unit 5 that receives signals generated from a plurality of sensors during operation of the test vehicle 1, the mobile-based GDS 10 receives six signals among the plurality of signals of the vehicle control unit 5 by activating a sampling menu 10A to classify the received signals into six input data, and at the same time, the judder occurrence determination device 20 receives an accelerometer signal among the plurality of signals of the vehicle control unit 5 to classify the received signal as the maximum value of vibration. In this case, the plurality of sensors are sensors mounted on the vehicle, which are installed in the vehicle together with the double clutch 3 provided in the DCT 2 of the test vehicle 1.

Therefore, the test vehicle 1 uses, as combination variables, the DCT 2, the clutch samples including two types of geometric judder occurrence samples/three types of friction judder occurrence samples/two types of normal state samples, and clutch temperatures (about 100 temperatures) during traveling, and therefore, about 1400 test data are measured. In this case, the DCT 2 1 and the clutch 1 including the two types of geometric judder occurrence samples/three types of friction judder occurrence samples/ two types of normal state samples may be classified into a first test vehicle, and the DCT 2 2 and the clutch 2 including the two types of geometric judder occurrence samples/three types of friction judder occurrence samples/two types of normal state samples may be classified as a second test vehicle.

Vehicle (2)*clutch sample (7)*clutch temperatures during traveling (100)=1,400 test data measurement  Example of combination variable:

For example, the six input data for the first test vehicle are classified as an engine RPM, an input shaft RPM 1 (i.e., input shaft RPM of a first clutch), a longitudinal acceleration sensor value, a vehicle speed, a clutch 1 temperature (i.e., temperature of the first clutch), and a clutch 1 slip RPM (i.e., slip RPM of the first clutch), and the six input data for the second test vehicle are classified into the engine RPM, the input shaft RPM 2, the longitudinal acceleration sensor value, the vehicle speed, the clutch 2 temperature, and the clutch 2 slip RPM.

Therefore, the measuring of the test data (S14) accumulates the six input data as thousands of (e.g., about 1,400) GDS sample data, and at the same time, determines the judder occurrence during tests of first and second test systems as the maximum value of vibration of the accelerometer signal.

In particular, the mobile-based GDS 10 measures the six input data of the vehicle control unit 5 with the GDS sampling period, and the GDS sampling period applies a longer measurement set time interval T than a real measurement period of the GDS itself.

For example, the determining of satisfaction of the test data (S15) is to select only the GDS sample data obtained in a state where a measurement required time interval t does not exceed the measurement set time interval T, which is performed by re-measuring the six input data (S15b) following the result of comparing the measurement required time interval t and the measurement set time interval T of the data measured in each condition (S15a).

To this end, the re-measurement "t<T" is applied so that the six input data are re-measured only when the measurement required time interval t is longer than the measurement set time interval T.

For example, the extracting of the data labelling (S16) performs the labelling processing based on the result of determining whether the judder occurs by using the maximum value of vibration of the accelerometer signal of the judder occurrence determination device 20 for the GDS sample data obtained as the six input data of the mobile-based GDS 10, and therefore, extracts the GDS sample data (S14) as B data labelling. In this case, the B data labelling are about 1,400 data labelling.

In particular, the labelling processing changes each of the 1,400 GDS sample data to one data with one row, and performs the labelling for each data by labelling the data as "No problem" when each data from the data capable of the judder occurrence determination is smaller than the determination value (i.e., the maximum value of vibration), while labelling the data as "Problematic level," "Geometric judder," or "Friction judder" when each data is greater than the determination value (i.e., the maximum value of vibration).

For example, the refining of the data labelling (S17) includes normalizing the A input data (S17a), standardizing the A input data (S17b), and refining time-applied data (S17c). In this case, the A input data are data applied to the measuring of the test data (S14).

To this end, the normalizing (S17a) and the standardizing (S17b) are as follows.

$Z(x)=[(X(\text{data labelling})-\text{mean})]/\text{standard deviation}$  Normalization:

$X_{new}=[(X(\text{data labelling})-X_{min}(\text{minimum})]/[(X_{max}(\text{max})-X_{min}(\text{minimum})]$  Normalization:

Therefore, in the extracting of data labelling (S16), the influence of the size of the data is removed through the normalization and the standardization.

In addition, the refining of the time applied data (S17c) is performed by inputting the time interval of [T−t+Δt~T] as 0 when the measurement required time interval t for the A input data applied to extract the data labelling (S14, S15) is shorter than the measurement set time interval T.

In particular, the refining of the data labelling (S17) may first perform refining the time applied data (S17c) and then perform normalizing (17b) and standardizing (17c), like the refining of the time applied data (S17c)→the normalizing (S17a)→the standardizing (S17b).

For example, the extracting of the artificial intelligence use data (S18) classifies 1,400 data labelling that have undergone normalization/standardization/refinement into D learning data and E validation verification data. In this case, the number of the D learning data is about 1,000, and the number of the E validation verification data is about 400.

In particular, the 1,000 learning data are selected as high-quality data among 1,400 GDS sample data and/or 1,400 data labelling, and the selection criterion is a case of sufficiently including all three output types, that is, "No problem," "Problematic level/Geometric judder," and "Problematic level/Friction judder."

Referring back to FIG. 2, the building of the DNN model (S20) includes reading learning data (S21), design an artificial intelligence model (S22), reading validation verification data (S23), verifying the artificial intelligence model (S24), confirming accuracy of the artificial intelligence model (S25), redesigning the artificial intelligence model (S26), and satisfying the model verification (S27).

For example, the designing of the artificial intelligence model (S22) develops a DNN model using a deep neural network (DNN) from about 1,000 learning data of the artificial intelligence use data (S18) confirmed in the reading of the learning data (S21).

To this end, the designing of the artificial intelligence model (S22) includes extracting 1,000 data features (S22a) and establishing a structure of the DNN model (S22b). In this case, the extracting of the 1,000 data features (S22a) applies CNN and Max Pooling methods, and the establishing of the structure of the DNN model (S22b) applies a layer connection method.

Therefore, the structure of the DNN model is primarily built as the judder determination artificial intelligence model 30.

For example, the verifying of the artificial intelligence model (S24) is performed by applying about 400 validation verification data of the artificial intelligence use data (S18) confirmed in the reading of the validation verification data (S23) to the structure of the DNN model (S22), and the confirming of the accuracy of the artificial intelligence model (S25) is performed by confirming the judder diagnostic result of the structure of the DNN model (S22) for the validation verification data.

In particular, the confirming of the accuracy of the artificial intelligence model (S25) sets and applies the judder diagnostic accuracy according to the result of applying the DNN model of the validation verification data as P %. In this case, the "P %" is set as the judder diagnostic accuracy of 90% or more.

For example, the redesigning of the artificial intelligence model (S26) is a case where the structure of the DNN model (S22) provides a result value of less than 90% (P %) of the judder diagnostic accuracy from 400 validation verification data, which is a procedure that returns to the step (S22) to go through a trial and error process that is repeated again based on the experience of the structure of a primary DNN model (S22). In this case, the experience-based trial and error process is a method for continuously substituting a set of input/output (i.e., about 1,000 learning data) previously found to adjust a weight or a bias between these neurons so that real output data (i.e., 400 validation verification data) and prediction value are matched to the maximum.

Figure 4:
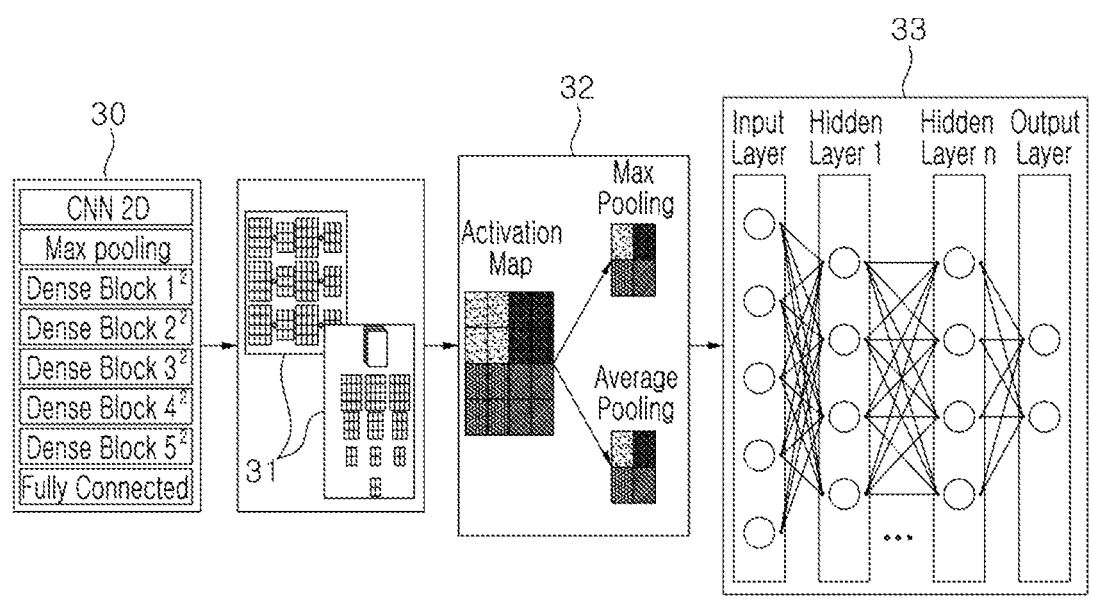
FIG. 4 shows an example in which a judder determination artificial intelligence model according to the present disclosure is established as a DNN model through an artificial intelligence model redesign process.

FIG. 4 shows that the primary DNN model built with the judder determination artificial intelligence model 30 is redesigned through a convolution neural network (CNN) 31, a max pooling network (MPN) 32, and a layer connection network (LCN) 33, and the CNN 31 and the MPN 32 perform feature extraction from about 1,000 learning data (S18), and the LCN 33 performs the input/output layer connection for the extracted feature. In this case, the CNN 31, the MPN 32, and the LCN 33 are examples, and therefore, may be designed and developed differently according to the DNN.

For example, the satisfying of the model validation (S27) is a case where the structure of the redesigned DNN model (S22) provides a result value of 90% or more (P %) of the judder diagnostic accuracy from the 400 validation verification data.

Therefore, the satisfying of the model verification (S27) means that the primary DNN model goes through the process of developing the DNN model through the trial and error and experience and then is finalized as a suitable DNN model and completely designed/developed/built as the judder determination artificial intelligence model 30.

Referring back to FIG. 2, the performing of the artificial intelligence diagnosis (S30) indicates that the judder occurrence level/cause of the vehicle 1-1 are evaluated by inserting or mounting its software into or on the mobile-based GDS 10 by using the finally developed DNN model as the judder determination artificial intelligence model 30 and then applying the mobile-based GDS 10 to the vehicle 1-1 in the field.

Figure 5:
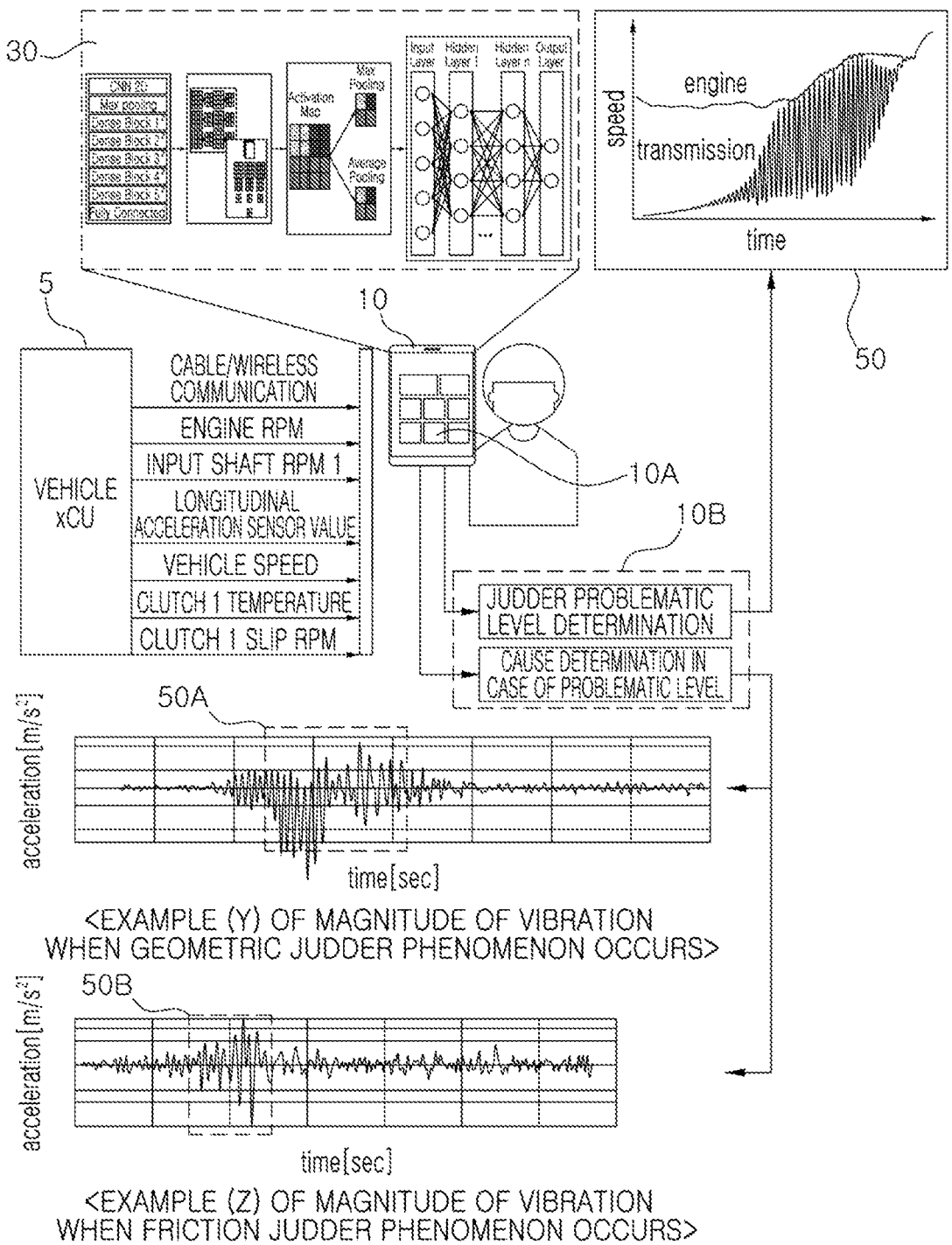
FIG. 5 shows a state of performing the judder diagnosis on a vehicle with a judder determination artificial intelligence model logic mounted on a mobile-based GDS according to the present disclosure.

Referring to FIG. 5, the mobile-based GDS 10 drives the judder determination artificial intelligence model 30 mounted with a sampling menu 10A displayed on a screen, and samples six signals from the operating vehicle 1-1 (see FIG. 3) at a certain period. In this case, the vehicle 1-1 is a vehicle to which the DCT 2 and the double clutch 3 are applied.

Therefore, the mobile-based GDS 10 may secure the judder diagnostic sampling data by sampling, as six input data, the six signals, that is, the engine RPM, the input shaft RPM of the double clutch, the longitudinal acceleration sensor value, the vehicle speed, the double clutch temperature, and the slip RPM of the double clutch, among the plurality of signals detected by the vehicle control unit 5 of the vehicle 1-1. In this case, the mobile-based GDS 10 applies the sampling period as the real measurement period of the GDS itself.

Then, the judder determination artificial intelligence model 30 driven by the mobile-based GDS 10 extracts the feature of the judder diagnostic sampling data secured through the CNN 31/the MPN 32 among the CNN 31/the MPN 32/the LCN 33 (see FIG. 4) of the internal logic and then outputs two judder diagnostic values (e.g., determination/cause of the problematic level) from a judder diagnostic menu 10B as the judder diagnostic result.

For example, the judder diagnostic menu 10B is classified into a judder menu 50, a geometric judder menu 50A, and a friction judder menu 50B, the judder menu 50 is shown as a vehicle speed-time based vibration phenomenon line diagram capable of the determination of the problematic level, and the geometric judder menu 50A and the friction judder menu 50B are shown as a vehicle acceleration-time based vibration phenomenon line diagram capable of classifying the cause of the problematic level.

Therefore, the geometric judder menu 50A may help quickly replace the double clutch by easily identifying the geometric judder occurrence caused by the geometric deviation of the rotation mechanism of the double clutch 3, which is the occurrence cause of the judder phenomenon, and the friction judder menu 50B may make it quickly improve the judder diagnostic software (or logic) by easily identifying the friction judder occurrence caused by the change in the friction characteristics due to the contamination or durability of the clutch friction material of the double clutch 3, which is the occurrence cause of the judder phenomenon.

As described above, the vehicle judder diagnostic method using artificial intelligence applied to the mobile-based GDS 10 according to the present exemplary embodiment diagnoses the vibration when starting a vehicle or operating an engine by extracting the artificial intelligence use data with the plurality of sensor signals of the DCT-mounted test vehicle 1, mounting the DNN model developed by the trial and error process of the deep neural network (DNN) as the judder determination artificial intelligence model 30 in the mobile-based GDS 10, and diagnosing the level and cause of the judder occurrence for the judder phenomenon of the vehicle 1-1 with the judder determination artificial intelligence model 30 by sampling the plurality of sensor signals of the really operating vehicle 1-1 by the mobile-based GDS 10.

Therefore, the vehicle judder diagnostic method using artificial intelligence may provide the reliable service to the customer by separately diagnosing whether the judder occurrence cause of the really operating vehicle 1-1 is the geometric judder or the friction judder by using only the plurality of signals detected by the vehicle control unit 5 of the vehicle 1-1, which is being operated in the judder evaluation mode by using artificial intelligence of the judder determination artificial intelligence model 30, by the mobile-based GDS 10, and in particular, separately diagnosing whether the judder occurrence cause is the geometric judder or the friction judder in addition to the quick judder phenomenon determination such as the conventional method by applying the tablet PC-based GDS 10 as the mobile-based GDS 10.

What is claimed is:

1. A vehicle judder diagnostic method using artificial intelligence, the vehicle judder diagnostic method comprising:
    sampling data that samples input data by using a mobile-based global diagnostic system (GDS) in a test vehicle whose judder occurrence is measured by a judder occurrence determination device and extracts artificial intelligence use data;
    building a DNN model that develops the artificial intelligence use data as a judder determination artificial intelligence model through the trial and error of a deep neural network (DNN); and
    performing artificial intelligence diagnosis that mounts the judder determination artificial intelligence model in the mobile-based GDS and confirms whether the judder occurs in a judder diagnostic mode of the test vehicle,
    wherein the sampling of the data comprises:
    preparing test data that builds the test vehicle;
    performing GDS measurement that operates the test vehicle in a judder diagnostic mode and performs the sampling by the mobile-based GDS while detecting an accelerometer measurement signal of the test vehicle by the judder occurrence determination device;
    extracting data labelling by labelling the input data;
    refining the data labelling that removes influence of the size of the data labelling and influence of the sampling period; and
    extracting the artificial intelligence use data by classifying the data labelling into learning data and validation verification data, and
    wherein the preparing of the test data comprises:
    selecting a double clutch transmission (DCT) and a double clutch as a judder test device;

selecting the DCT and the double clutch as the test vehicle; and defining a judder evaluation for the test vehicle.

2. The method of claim 1, wherein the input data is acquired by sampling sensor signals of the test vehicle.

3. The method of claim 2, wherein the types of the sensor signals are one or more among an engine RPM, a clutch input shaft RPM, a longitudinal acceleration, a vehicle speed, a clutch temperature, and a clutch slip RPM.

4. The method of claim 1, wherein the double clutch is composed of two types of geometric judder occurrence samples of a clutch due to deformation of a clutch cover and exceeding a processing error limit of a cover plate, three types of friction judder occurrence samples of the clutch due to aging of the test vehicle, a change in a physical property value of a clutch surface material, and a deterioration test of the clutch surface, and two types of normal state samples of a new clutch and the clutch in a normal state after the aging of the test vehicle.

5. The method of claim 1, wherein the defining of the judder evaluation is classified into a vehicle operation condition and a judder test condition, wherein the vehicle operation condition indicates a warm-up state and a vehicle starting state without operating an acceleration pedal from a stop on a general road, and wherein the judder test condition indicates a clutch temperature region for the double clutch.

6. The method of claim 5, wherein the clutch temperature region is classified into five temperature regions at an interval of 50° C., and the five temperature regions each have 20 quantities and 100 quantities are applied as the judder test condition.

7. The method of claim 1, wherein the performing of the GDS measurement comprises:

measuring the test data that samples a plurality of sensor signals detected by a vehicle control unit of the test vehicle as the input data by the mobile-based GDS; and determining satisfaction of the input data with a sampling period.

8. The method of claim 7, wherein 1,400 input data are measured through the sampling.

9. The method of claim 7, wherein the satisfaction of the sampling period is confirmed as a state where a measurement required time interval of the sampling does not exceed a measurement set time interval, and wherein the plurality of sensor signals are resampled if the measurement required time is longer than the measurement set time interval.

10. The method of claim 1, wherein the labelling generates the data labelling by determining the judder occurrence for the input data classified into "No judder problem," "Judder problematic level," "Geometric judder," and "Friction judder".

11. The method of claim 1, wherein the refining of the data labelling comprises:

normalizing and standardizing the input data; and converging the time interval to 0 when a measurement required time interval of the sampling for the input data is shorter than a measurement set time interval.

12. The method of claim 1, wherein the learning data and the validity verification data are classified by the quality of the data labelling, wherein the learning data applies 70% of the data labelling, and the validity verification data applies 30% of the data labelling.

13. The method of claim 1, wherein the building of the DNN model comprises:

reading learning data of the artificial intelligence use data;

designing an artificial intelligence model by building the DNN model in the DNN from the learning data;

reading validity verification data of the artificial intelligence use data;

processing, by the DNN, the validity verification data as an input;

verifying an output of the artificial intelligence model with set judder diagnostic accuracy; and redesigning an artificial intelligence model that builds the DNN model again by the trial and error if the judder diagnostic accuracy is less than a set value or satisfying model verification that establishes the judder determination artificial intelligence model if the judder diagnostic accuracy is equal to or greater than the set value.

14. The method of claim 13, wherein the designing of the artificial intelligence model comprises:

extracting features from the learning data with convolution neural network (CNN) and max pooling (MP); and building the DNN model by connecting an input and an output by a layer.

15. The method of claim 13, wherein the judder diagnostic accuracy is a percentage for each of "No judder problem," "Judder problematic level," "Geometric judder," and "Friction judder," and wherein the set value is set as 90%.

16. The method of claim 1, wherein the performing of the artificial intelligence diagnosis samples the plurality of sensor signals of the test vehicle by the mobile-based GDS to acquire the sampled sensor signals as the input data of the test vehicle, confirms whether the judder occurs by processing the input data of the test vehicle with the judder determination artificial intelligence model driven by the mobile-based GDS, and classifies the judder into a geometric judder identified as a state of an occurrence frequency is changed and a friction judder identified as a state of the occurrence frequency is fixed.

17. A mobile-based GDS configured to execute the method of claim 1, wherein the mobile-based GDS comprises: a judder determination artificial intelligence model that extracts a plurality of sensor signals of a test vehicle as artificial intelligence use data by sampling the plurality of sensor signals, applies the artificial intelligence use data to building a DNN model with the trial and error of a deep neural network (DNN), and diagnoses a judder with the plurality of sensor signals sampled during operation of the test vehicle in a judder diagnostic mode to classify a geometric judder and a friction judder with a difference between occurrence frequencies.

18. The mobile-based GDS of claim 17, wherein the test vehicle is mounted with a double clutch transmission (DCT), and wherein the judder determination artificial intelligence model is driven in a tablet PC-based global diagnostic system (GDS).

* * * * *